US010102021B2

United States Patent
Banzhaf et al.

(10) Patent No.: US 10,102,021 B2
(45) Date of Patent: *Oct. 16, 2018

(54) SUPPORTING FLEXIBLE DEPLOYMENT AND MIGRATION OF VIRTUAL SERVERS VIA UNIQUE FUNCTION IDENTIFIERS

(71) Applicant: International Business Machines Corporation, Armonk, NY (US)

(72) Inventors: Gerhard Banzhaf, Nufringen (DE); David F. Craddock, New Paltz, NY (US); James M. Jenks, Vestal, NY (US); Angel Nunez Mencias, Stuttgart (DE); Justin D. Miller, Endicott, NY (US); Eric A. Weinmann, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/823,671

(22) Filed: Aug. 11, 2015

(65) Prior Publication Data
US 2015/0378772 A1    Dec. 31, 2015

Related U.S. Application Data

(63) Continuation of application No. 14/319,430, filed on Jun. 30, 2014.

(51) Int. Cl.
*G06F 15/173*    (2006.01)
*G06F 9/455*    (2018.01)
(Continued)

(52) U.S. Cl.
CPC ........ *G06F 9/45558* (2013.01); *H04L 47/827* (2013.01); *G06F 2009/4557* (2013.01); *H04L 67/10* (2013.01)

(58) Field of Classification Search
CPC ......... G06F 9/45558; G06F 2009/4557; H04L 47/827; H04L 67/10
(Continued)

(56) References Cited

U.S. PATENT DOCUMENTS 8,141,092 B2 *    3/2012    Brown ................... G06F 13/385
                                                                                718/1
8,473,947 B2 *    6/2013    Goggin ................... G06F 3/061
                                                                                718/1
(Continued)

OTHER PUBLICATIONS

List of IBM Patents or Patent Applications Treated as Related; (Appendix P), Filed Aug. 23, 2015; 2 pages.
(Continued)

*Primary Examiner* — Joseph E Avellino
*Assistant Examiner* — Binod J Kunwar
(74) *Attorney, Agent, or Firm* — Cantor Colburn LLP

(57) ABSTRACT

A management system and method that generally allocates a virtual function to a virtual function definition of a virtual server, where the virtual function definition of the virtual server is previously assigned with a unique function identifier, and assigns the unique function identifier to the virtual function in response to the allocating of the virtual function, where the unique function identifier causes a discovery of the virtual function by the virtual server.

1 Claim, 12 Drawing Sheets

(51) Int. Cl.
*H04L 12/911* (2013.01)
*H04L 29/08* (2006.01)

(58) Field of Classification Search
USPC .......................................... 709/226; 710/104
See application file for complete search history.

(56) References Cited

U.S. PATENT DOCUMENTS

| | | | | |
|---|---|---|---|---|
| 8,542,350 B2* | 9/2013 | Nakanishi | ............. | G06F 3/0428 356/51 |
| 8,626,970 B2* | 1/2014 | Craddock | ............... | G06F 9/468 710/64 |
| 9,003,007 B2* | 4/2015 | Kern | .................... | G06F 9/5077 709/223 |
| 9,134,911 B2* | 9/2015 | Craddock | ........... | G06F 9/30003 |
| 9,323,620 B2* | 4/2016 | Graham | .............. | G06F 11/1415 |
| 9,432,304 B2* | 8/2016 | Johnsen | ............... | G06F 9/45533 |
| 9,542,350 B1* | 1/2017 | Kissell | ................ | G06F 13/4068 |
| 9,720,775 B2* | 8/2017 | Arroyo | ............... | G06F 11/1438 |
| 2005/0080982 A1* | 4/2005 | Vasilevsky | ........... | G06F 3/0607 711/1 |
| 2006/0230185 A1* | 10/2006 | Errickson | ............... | H04L 49/35 709/250 |
| 2008/0022018 A1* | 1/2008 | Konno | ................ | G06F 13/4221 710/11 |
| 2008/0189432 A1* | 8/2008 | Abali | .................... | G06F 9/4856 709/238 |
| 2009/0313391 A1* | 12/2009 | Watanabe | .......... | G06F 9/45558 710/8 |
| 2010/0082874 A1* | 4/2010 | Baba | .................... | G06F 13/387 710/316 |
| 2010/0165874 A1* | 7/2010 | Brown | ................ | G06F 13/4022 370/254 |
| 2011/0179414 A1* | 7/2011 | Goggin | ................... | G06F 3/061 718/1 |
| 2011/0202702 A1* | 8/2011 | Fan | ....................... | G06F 13/102 710/313 |
| 2011/0320652 A1* | 12/2011 | Craddock | ............... | G06F 9/468 710/64 |
| 2011/0321065 A1* | 12/2011 | Gopalakrishnan | ...... | G06F 9/545 719/328 |
| 2012/0042034 A1* | 2/2012 | Goggin | ................ | G06F 9/4856 709/216 |
| 2012/0054393 A1* | 3/2012 | Yoshimura | ............ | G06F 13/387 710/110 |
| 2012/0166690 A1* | 6/2012 | Regula | .................. | G06F 13/404 710/104 |
| 2012/0266165 A1* | 10/2012 | Cen | ...................... | G06F 9/45541 718/1 |
| 2012/0311106 A1* | 12/2012 | Morgan | .............. | H04L 41/0806 709/220 |
| 2013/0159686 A1* | 6/2013 | Graham | ............. | G06F 9/5077 713/1 |
| 2013/0160002 A1* | 6/2013 | Graham | ............. | G06F 9/45558 718/1 |
| 2013/0275568 A1* | 10/2013 | Nguyen | ............. | H04L 41/0806 709/223 |
| 2014/0101316 A1* | 4/2014 | Lee | ....................... | G06F 9/5072 709/226 |

OTHER PUBLICATIONS

Gerhard Banzhaf, et al., "Supporting Flexible Deployment and Migration of Virtual Servers Via Unique Function Identifiers", U.S. Appl. No. 14/319,430, filed Jun. 30, 2014.

* cited by examiner

SUPPORTING FLEXIBLE DEPLOYMENT AND MIGRATION OF VIRTUAL SERVERS VIA UNIQUE FUNCTION IDENTIFIERS

DOMESTIC PRIORITY

This application is a continuation of U.S. application Ser. No. 14/319,430, filed on Jun. 30, 2014, the disclosure of which is incorporated by reference herein in its entirety.

BACKGROUND

The disclosure relates generally to peripheral component interconnect devices within a virtualization context, and more specifically, to deployment and migration of a virtual server that utilizes peripheral component interconnect devices while retaining a configuration.

In general, a virtual server is deployed in a node of a cluster environment and utilizes peripheral component interconnect (PCI) devices of the node. Each PCI device includes physical and/or virtual PCI functions that are typically identified by routing identifications (e.g., plugging positions and/or function-type-specific identifiers). A configuration of the virtual server is utilized to associate the routing identifications of each PCI function with a function definition, so that the PCI function may be accessed via the routing identifications by the virtual server through the associated function definitions. Thus, when the virtual server is deployed or migrated between nodes of the cluster environment, the configuration must be altered to accommodate routing identifications of a subsequent node. Yet, altering the configuration every time the virtual server is deployed or moved causes time delays in server deployment and consumption of cluster environment resources, which are a hindrance to the flexibility of virtualization.

For example, in a virtualized server environment, a PCI device (e.g., adapters, PCI hardware resources, and other devices) of a node is shared among multiple virtual servers within that node via PCI Express (PCIe) and Single-root I/O virtualization (SR-IOV). PCIe is an interface for attaching the PCI device to a central processor complex of the node. SR-IOV is utilized to extend PCIe by providing support for a significant number of PCI functions within the PCI device. That is, SR-IOV allows PCI functions of the PCI device, as defined by PCIe, to consist of a single physical function (PF), associated with multiple virtual functions (VFs). A PF is a PCIe function that is privileged and is used to manage characteristics of the virtual functions. A VF is a PCIe function associated with a PF, and is directly accessible by a virtual server. The VFs may be serially shared (reused) by multiple virtual servers. PF and VFs are assigned a routing identification (RID) as defined by PCIe to uniquely identify the PF or VF and control access to each virtual server.

Continuing, when defining or configuring a virtual server of the multiple virtual servers, that virtual server's definition or configuration may contain multiple virtual PCI function definitions. Each virtual PCI function definition serves a particular purpose (such as providing access to a specific type of PCI adapter or device, providing access to a particular physical communication network, and providing access to a particular storage area network or zone thereof); and the virtual server's virtual PCI function definitions are assigned to (or associated with) the routing identifications when the virtual server is deployed on the node (e.g., a particular physical server). Yet, because the configuration of the virtual server directly relies on the routing identifications, the configuration must be altered every time the server is deployed (e.g., cloned) or migrated due to the limitations of the routing identifications.

In particular, an identification scheme may utilize media access control (MAC) addresses, Fibre Channel (FC) addresses, system-wide function identifications (FIDs), and physical network identifications (PNIDs) as routing identifications. The MAC address scheme is limited to only network card PCI devices and only applies tracking the network card being moved between different slots. Additionally, the MAC address scheme has no application for moving virtual servers (e.g., does not support cloning, as each virtual server must use different MAC addresses). Similarly, the FC address scheme is limited to only FC adapter card PCI devices and includes similar issues as specified for the MAC addresses. Further, the FID scheme is limited by an FID being permitted to have a singular use. In turn, cloning or moving a virtual server is impossible when the same FID is utilized within the same or subsequent node. Furthermore, the PNIDs scheme includes the problem of only supporting network PCI functions and does not support when multiple PCI functions need to be connected to the same network (e.g., for redundancy or throughput configurations).

Therefore, when flexibly deploying (e.g., cloning) or migrating virtual servers in a cluster environment, dynamically assigning/associating the PF and VFs to the corresponding function definitions of the virtual servers is a problem due to the limitations of different routing identifications schemes.

SUMMARY

According to one embodiment of the present invention, a method of allocating a virtual function to a virtual function definition of a virtual server, where the virtual function definition of the virtual server is previously assigned with a unique function identifier, and assigning the unique function identifier to the virtual function in response to the allocating of the virtual function, where the unique function identifier causes a discovery of the virtual function by the virtual server.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, when a virtual server is deployed or migrated between nodes of the cluster environment, the configuration must be altered. Thus, what is needed is a mechanism that avoids the altering of configurations so as not to hinder the flexibility of server virtualization.

In general, embodiments of the present invention disclosed herein may include a management system, method, and/or computer program product that enables deployment and/or migration of virtual servers that utilize PCI devices, while retaining configurations particular to each virtual server regardless of a host node in which the virtual server resides after deployment and/or migration.

For instance, the management system and method generates and assigns a unique function identifier (UFID) to each virtual function, when a virtual server is defined/configured to contain virtual PCI function definitions. Further, when the virtual server is deployed on a physical server, the virtual functions are assigned to that virtual server, based on the virtual servers' virtual function definitions and associated requirements. That is, for each allocated virtual function, the UFID of the corresponding virtual function definition is assigned. In turn, the management system and method provides a capability to the virtual server to query the set of virtual functions that has been assigned to it, as well as their UFIDs. For example, when a virtual server is activated, the virtual server exploits this capability to determine which specific virtual function has been assigned to each of its virtual function definitions. And because the UFIDs are unique per virtual server, the management system and method supports flexible deployment on different physical servers in a cluster environment, dynamic assignment of virtual functions, as well as virtual server cloning and migration in the cluster environment.

Therefore, the management system and method generally allocate a virtual function to a virtual function definition of a virtual server, where the virtual function definition of the virtual server is previously assigned with a unique function identifier, and assign the unique function identifier to the virtual function in response to the allocating of the virtual function, where the unique function identifier causes a discovery of the virtual function by the virtual server.

Figure 1:
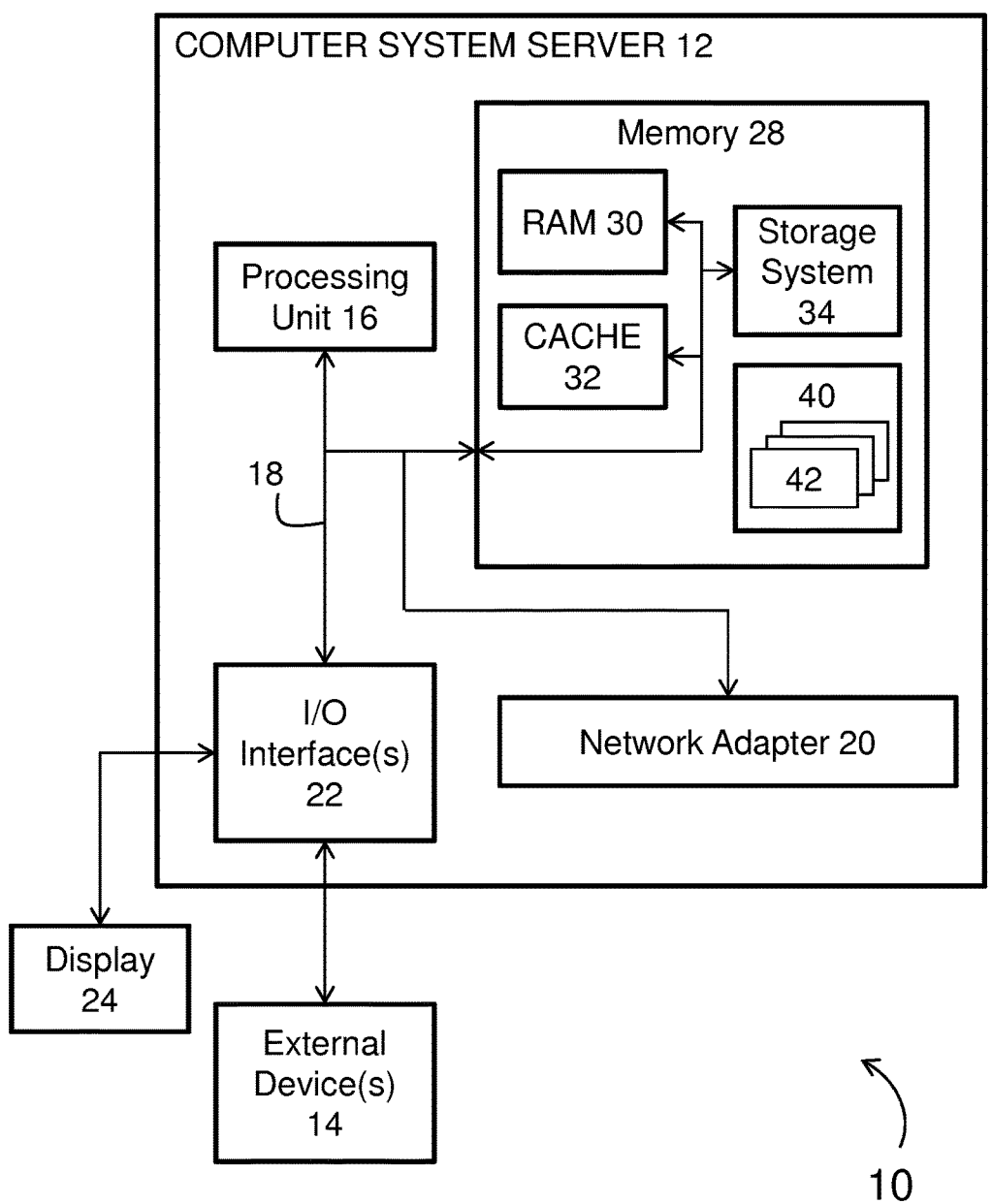
FIG. 1 illustrates a node according to an embodiment of the present invention.
Figure 2:
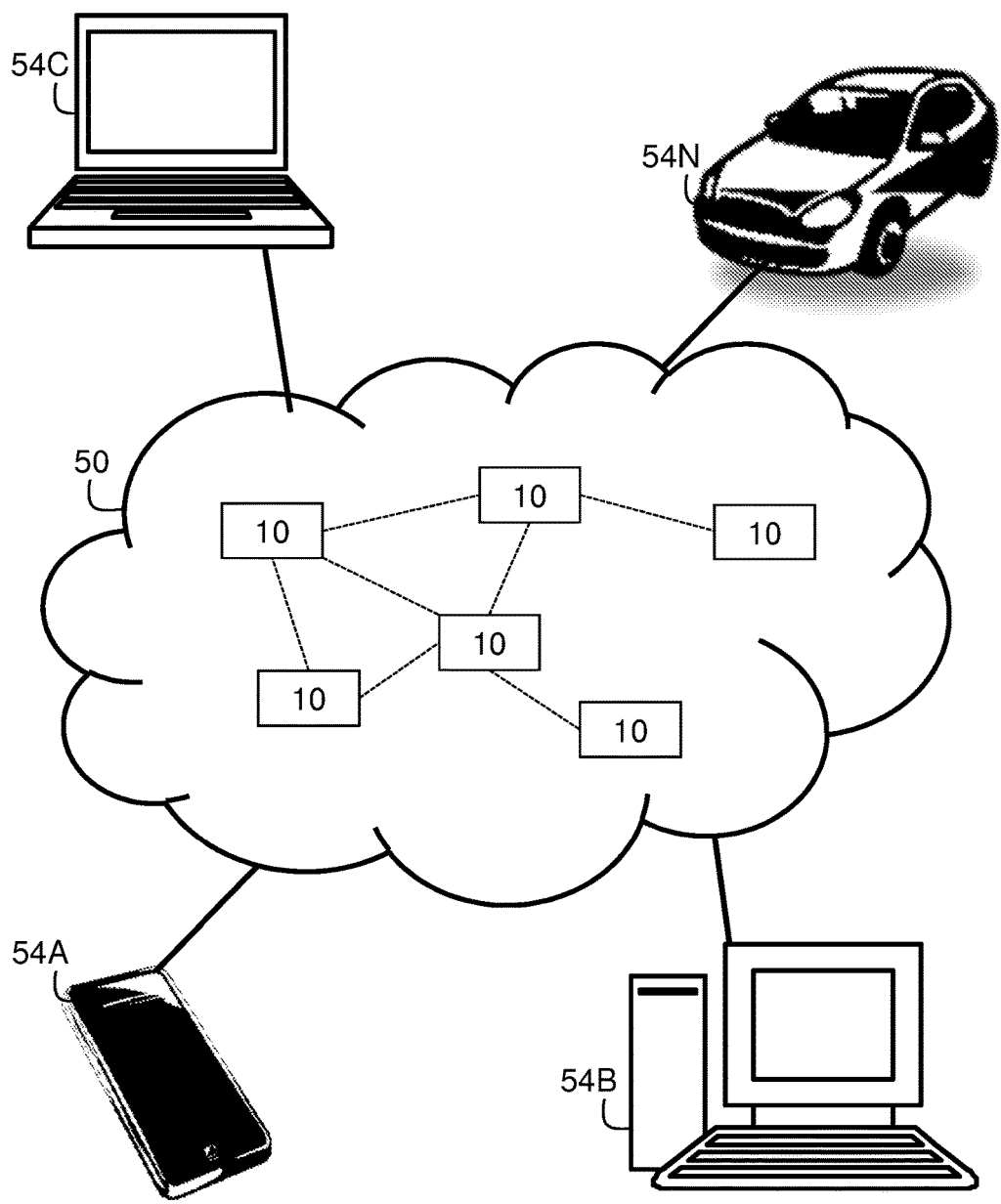
FIG. 2 illustrates a cloud computing environment according to an embodiment of the present invention.
Figure 4A:
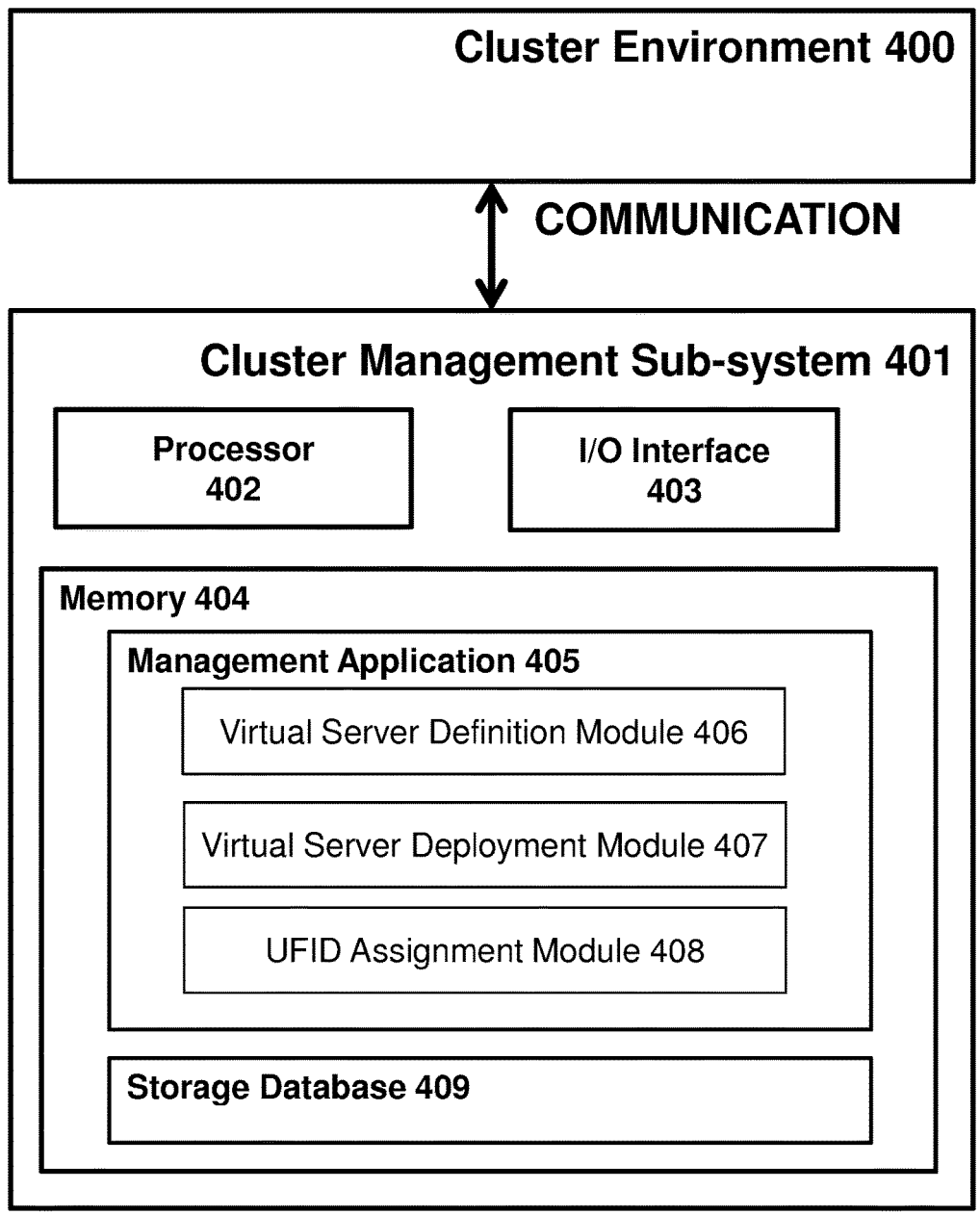
FIGS. 4A-B illustrate a schematic of a system and a deployment and migration of virtual servers.
Figure 4B:
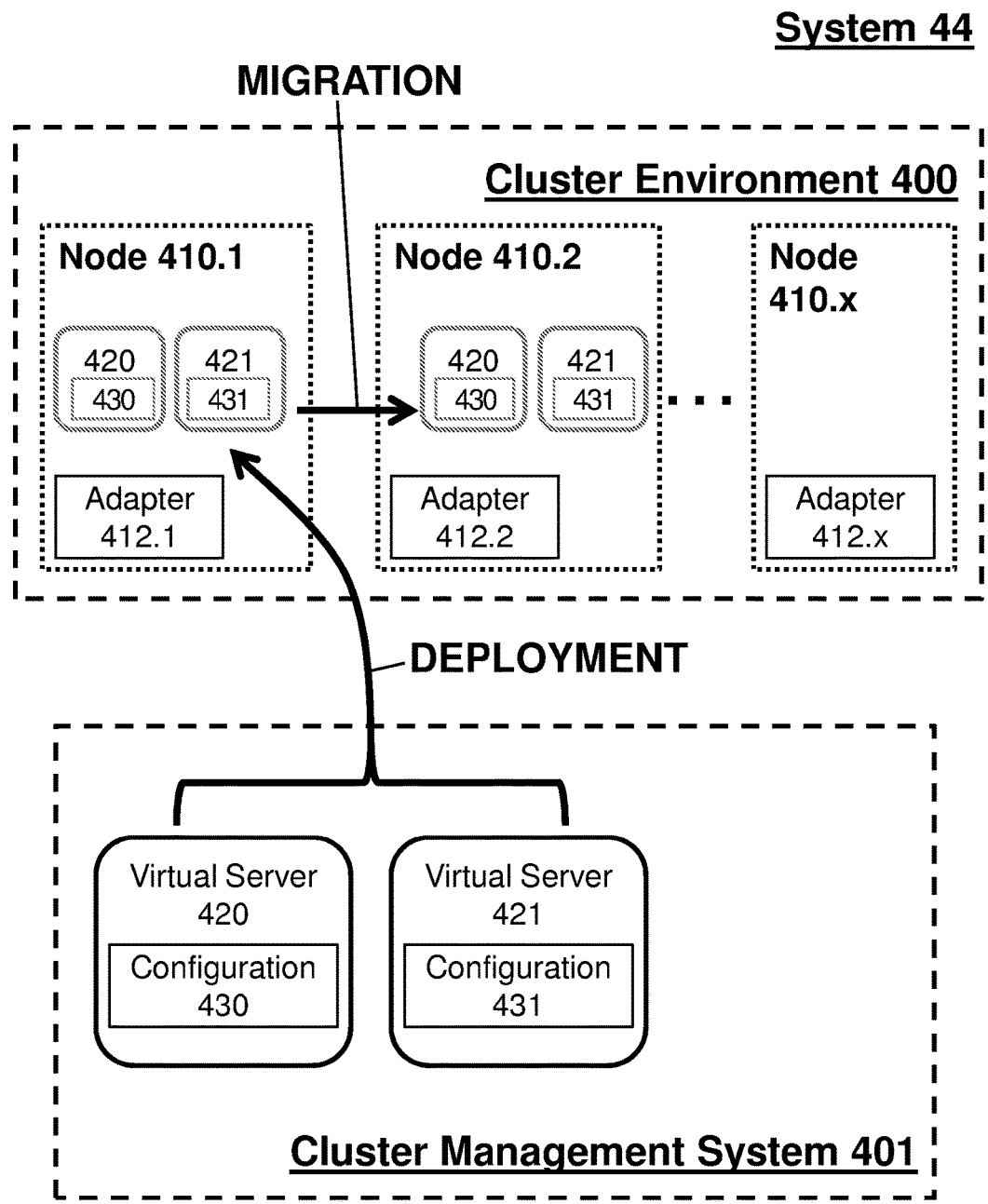

Systems and/or computing devices, such as the management system (e.g., cloud computing node 10 and computer system server 12 of FIG. 1; cloud computing environment 50 of FIG. 2; system 44, cluster environment 400, and cluster management sub-system 401 of FIG. 4A; nodes 410.1 and virtual server 420 of FIG. 4B; etc.), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, or handheld computer, or some other computing system and/or device (e.g., personal digital assistant (PDA) or cellular telephone 54A, desktop computer 54B, laptop computer 54C, and automobile computer system 54N of FIG. 2).

In general, computing devices further may include a processor (e.g., processing unit 16 of FIG. 1 and processor 402 of FIG. 4A) and a computer readable storage medium (e.g., memory 28 of FIG. 1 and memory 404 of FIG. 4A), where the processor receives computer readable program instructions, e.g., from the computer readable storage medium, and executes these instructions, thereby performing one or more processes, including one or more of the processes described herein (e.g., assignment of UFIDs to virtual function definitions of virtual servers, allocation of virtual functions to the virtual function definitions of the virtual server, and assignment of the UFIDs to the allocated virtual functions).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device (e.g., a user's computer), partly on the computing device, as a stand-alone software package, partly on a local computing device and partly on a remote computer device or entirely on the remote computer device. In the latter scenario, the remote computer may be connected to the local computer through any type of network (as further described below), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network, a network of interconnected nodes, and/or a wireless network and comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the management system and method and/or elements thereof may be implemented as computer readable program instructions on one or more computing devices (e.g., computer workstation, server, desktop, etc.), stored on computer readable storage medium associated therewith. A computer program product may comprise such computer readable program instructions stored on computer readable storage medium for carrying and/or causing a processor to carry out the of operations of the management system and method.

The management system and method and/or elements thereof may also be implemented in a cloud computing architecture; however, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources, such as networks, network bandwidth, servers, processing, memory, storage, applications, virtual machines, and services (e.g. sharing PCI devices via allocation of the plurality of unique function identifiers as described below) that can be rapidly provisioned and released with minimal management effort or interaction with a provider of the service. This cloud model may include at least five characteristics (e.g., on-demand self-service, broad network access, resource pooling, rapid elasticity, and measured service), at least three service models (e.g., Software as a Service, Platform as a Service, and Infrastructure as a Service), and at least four deployment models (e.g., private cloud, community cloud, public cloud, and hybrid cloud).

On-demand self-service is an example of a cloud model characteristic where a cloud consumer can unilaterally provision computing capabilities, such as server time and network storage, as needed automatically without requiring human interaction with the service's provider. Broad network access is an example of a cloud model characteristic where capabilities are available over a network and accessed through standard mechanisms that promote use by heterogeneous thin or thick client platforms (e.g., computing systems as described above). Resource pooling is an example of a cloud model characteristic where the provider's computing resources are pooled to serve multiple consumers using a multi-tenant model, with different physical and virtual resources dynamically assigned and reassigned according to demand. Further, resource pooling provides a sense of location independence in that the consumer generally has no control or knowledge over the exact location of the provided resources but may be able to specify location at a higher level of abstraction (e.g., country, state, or datacenter). Rapid elasticity is an example of a cloud model characteristic where capabilities can be rapidly and elastically provisioned, in some cases automatically, to quickly scale out and rapidly released to quickly scale in. To the consumer, the rapid elasticity capabilities available for provisioning often appear to be unlimited and can be purchased in any quantity at any time. Measured service is an example of a cloud model characteristic where cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS) is an example of a service model where the capability provided to the consumer is to use the provider's applications running on a cloud infrastructure. The applications are accessible from various client devices through a thin client interface such as a web browser (e.g., web-based email). The consumer does not manage or control the underlying cloud infrastructure including networks, servers, operating systems, storage, or even individual application capabilities, with the possible exception of limited user-specific application configuration settings.

Platform as a Service (PaaS) is an example of a service model where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) is an example of a service model where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud is a cloud infrastructure that is operated solely for an organization. Private cloud may be managed by the organization or a third party and may exist on-premises or off-premises. Community cloud is a cloud infrastructure that is shared by several organizations and supports a specific community that has shared concerns (e.g., mission, security requirements, policy, and compliance considerations). Community cloud may be managed by the organizations or a third party and may exist on-premises or off-premises. Public cloud is a cloud infrastructure that is made available to the general public or a large industry group and is owned by an organization selling cloud services. Hybrid cloud is a cloud infrastructure that is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or operability of embodiments of the invention described herein. Regardless, cloud computing node 10 is capable of being implemented and/or performing any of the operability set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the operations of embodiments of the invention.

Program/utility 40, having a set of one or more program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the operations and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, an illustrative cloud computing environment 50 is depicted. As shown, cloud computing environment 50 comprises one or more cloud computing nodes 10 with which local computing devices used by cloud consumers, such as, for example, a personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer IaaS, PaaS, and/or SaaS for which a cloud consumer does not need to maintain resources on a local computing device. It is understood that the types of computing devices 54A-54N shown in FIG. 2 are intended to be illustrative only and that computing nodes 10 and cloud computing environment 50 can communicate with any type of computing system or computerized device over any type of network and/or network addressable connection (e.g., using a web browser).

Figure 3:
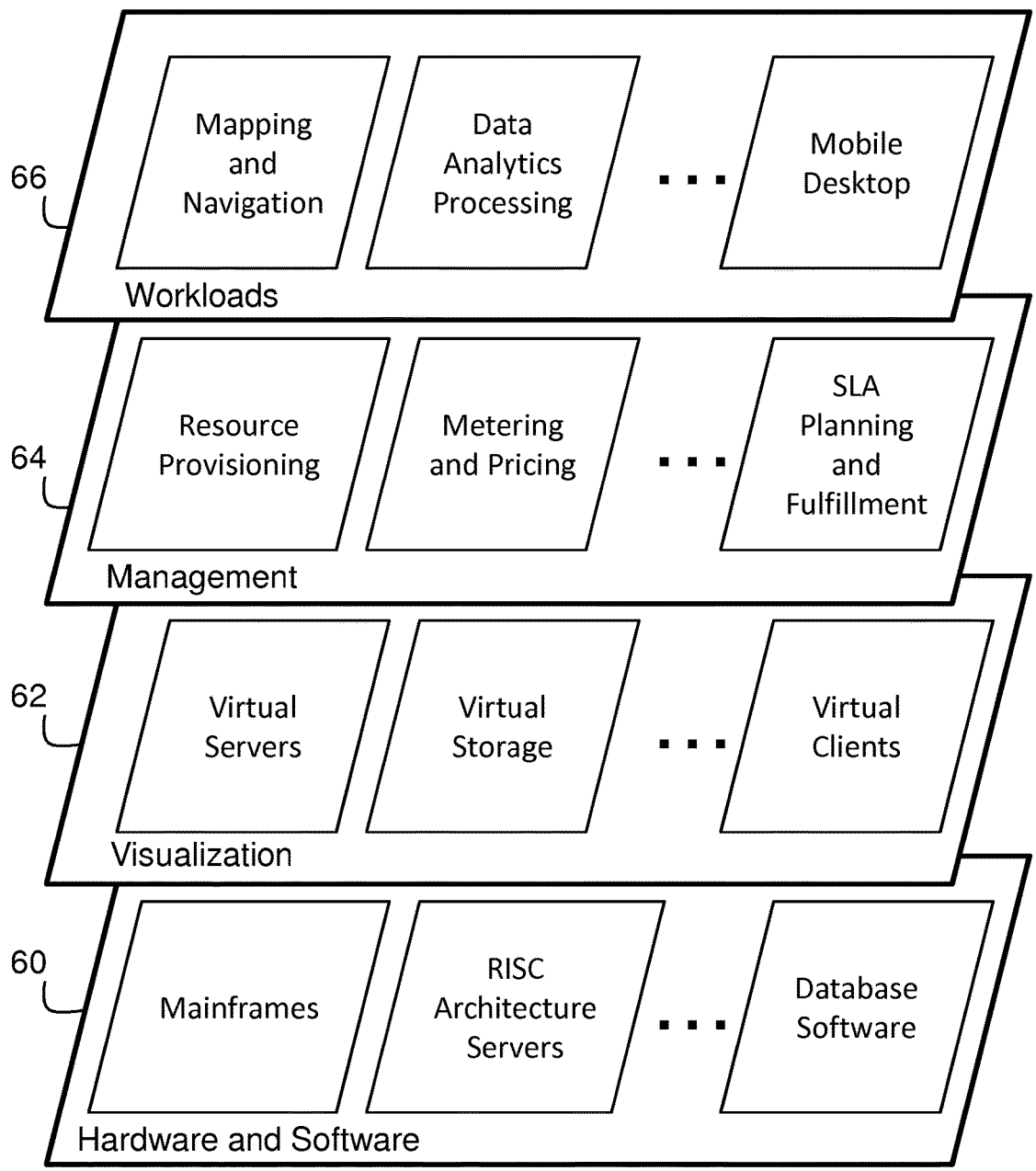
FIG. 3 illustrates abstraction model layers according to an embodiment of the present invention.

Referring now to FIG. 3, a set of operational abstraction layers provided by cloud computing environment 50 (FIG.

2) is shown. It should be understood in advance that the components, layers, and operations shown in FIG. 3 are intended to be illustrative only and embodiments of the invention are not limited thereto. FIG. 3 includes a hardware and software layer 60, a virtualization layer 62, a management layer 64, and a workloads layer 66.

Hardware and software layer 60 includes hardware and software components. Examples of hardware components include mainframes, in one example IBM zSeries systems; RISC (Reduced Instruction Set Computer) architecture based servers, in one example IBM pSeries systems; IBM xSeries systems; IBM BladeCenter systems; storage devices; networks and networking components; etc. Examples of software components include network application server software, in one example IBM WebSphere application server software; and database software, in one example IBM DB2 database software (IBM, zSeries, pSeries, xSeries, System p, System x System z, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; virtual clients; etc.

Management layer 64 may provide the operations described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of operability for which the cloud computing environment may be utilized. Examples of workloads and operations which may be provided from this layer include: mapping and navigation; software development and lifecycle management; virtual classroom education delivery; data analytics processing; transaction processing; mobile desktop; etc.

FIGS. 4A-4B illustrate a schematic of a system and a deployment and migration of virtual servers. FIGS. 4A-4B include a system 44 comprising a cluster environment 400 and a cluster management sub-system 401. The cluster management sub-system 401 further includes a processor 402, an I/O interface 403, and a memory 404. The memory 404 includes a management application 405 that comprises a virtual server definition module 406, a virtual server deployment module 407, and a UFID assignment module 408, along with a storage database 409. Further, the cluster environment 400 includes a plurality of nodes 410.1-410.x, each of which includes a plurality of adapters (as represented by adapter blocks 412.1, 412.2, and 412.x), where 'x' is an integer representing a number of nodes and a corresponding plurality of adapters. The adapters 412 may also be SR-IOV (Single Root I/O Virtualization) adapters comprising multiple virtual functions, whereby one or more VFs may be assigned to a virtual server. The cluster management sub-system 401 includes virtual servers 420, 421, which respectively include configurations 430, 431. The system 44 and elements therein may take many different forms and include multiple and/or alternate components and facilities. While a system 44 is shown in FIG. 4, the components illustrated in FIG. 4 are not intended to be limiting. Indeed, additional or alternative components and/or implementations may be used. For example, although one numbering sequence for the nodes 410 and the plurality of adapters 412 is offered, it should be understood that the same operability may be provided using fewer, greater, or differently implemented sequences.

In operation, the system 44 utilizes the cluster management sub-system 401 to generate and assign a UFID to each virtual function (or function in the case of a non-SR-IOV adapter), when a virtual server (e.g., 420, 421) is defined/configured to contain virtual PCI function definitions. Further, when the virtual servers 420, 421 are deployed (e.g., DEPLOYMENT Arrow) on a physical server or a node 410.1, the virtual functions are assigned to those virtual servers 420, 421, based on the virtual servers' virtual function definitions and associated requirements. That is, for each allocated virtual function, the UFID of the corresponding virtual function definition is assigned. In turn, the system 44 provides a capability to the virtual servers 420, 421 to query the set of virtual functions that has been assigned to each virtual server 420, 421, as well as the corresponding UFIDs. For example, when a virtual server 420 is activated, the virtual server exploits this capability to determine which specific virtual function has been assigned to each of its virtual function definitions. And because the UFIDs are unique amongst the virtual servers 420, 421, the system 44 supports flexible deployment on different nodes 410 in the cluster environment 400 and dynamic assignment of virtual functions, as well as virtual server cloning and migration (e.g., MIGRATION Arrow) in the cluster environment 400.

The cluster environment 400 is an example of a cloud computing environment 50, as described above, and communicates (e.g., COMMUNICATION Arrow) with the cluster management sub-system 401 to enable the deployment and migration of virtual servers 420, 421.

The cluster management sub-system 401 (e.g., a computing device as described above, such as a cloud computing node 10) is configured to deploy and migrate virtual servers 420, 421 while retaining configurations 430, 431. In operation, the cluster management sub-system 401 utilizes the processor 402 to receive computer readable program instructions from the memory 404 provided by the management application 405 and execute these instructions, thereby performing one or more processes defined by a management application 405 (e.g., assignment of UFIDs to virtual function definitions of virtual servers, allocation of virtual functions to the virtual function definitions of the virtual server, and assignment of the UFIDs to the allocated virtual functions).

The processor 402 may include any processing hardware, software, or combination of hardware and software utilized by the cluster management sub-system 401 that carries out the computer readable program instructions by performing arithmetical, logical, and/or input/output operations. Examples of the processor 402 include, but are not limited to, an arithmetic logic unit, which performs arithmetic and logical operations; a control unit, which extracts, decodes, and executes instructions from memory; and an array unit, which utilizes multiple parallel computing elements.

The input output (I/O) interface 403 may include a physical and/or virtual mechanism utilized by the cluster management sub-system 401 to communicate between elements internal and/or external to the cluster management sub-system 401. That is, the I/O interface 403 may be configured to receive or send signals or data within or for the cluster management sub-system 401. An example of the I/O interface 403 may include a network adapter card or network interface configured to receive computer readable program instructions from a network and forward the computer readable program instructions, original records, or the like for storage in a computer readable storage medium (e.g., memory 404) within the respective computing/processing device (e.g., cluster management sub-system 401).

The memory 404 may include a tangible device that retains and stores computer readable program instructions, as provided by the management application 405, for use by the processor 402 of the cluster management sub-system 401.

The management application 405 may include computer readable instructions designed to perform and/or cause the cluster management sub-system 401 to perform the deployment and migration of virtual servers 420, 421 (e.g., the configurations application 405 may generally be included within a computing device employing a computer operating system such as one of those mentioned above, and are accessed via a network in any one or more of a variety of manners). The management application 405 and modules 406, 407, 408 are an example of the program/utility 40, having a set of one or more program modules 42 of FIG. 1.

That is, the management application 405 may include computer readable program instructions (as defined by the virtual server definition module 406, the virtual server deployment module 407, and/or the UFID assignment module 408) configured to assign UFIDs to virtual function definitions of virtual servers, allocate virtual functions to the virtual function definitions of the virtual servers, and assign the UFIDs to the allocated virtual functions. The management application 405 is configured to assign UFIDs to virtual function definitions of virtual servers by utilizing virtual server definition module 406 and/or the virtual server deployment module 407 to generate a list of virtual server definitions for the virtual servers 420, 421 and assign UFIDs to each virtual server definition to generate corresponding configurations 430, 431.

For instance, the management application 405 performs assignment of a unique function identifier (UFID) to each virtual function definition that is part of a virtual server definition, such that at virtual server deployment time, when a resource management or deployment function assigns a virtual function to such a virtual function definition, this assignment can be done based on characteristics or requirements of the virtual function definition. The management application 405 further gets the UFID associated with the assigned virtual function, provides a service for a corresponding virtual server to query this UFID to determine which virtual function (on which physical adapter) has been assigned to each particular virtual function definition. Thus, the management application 405 supports migration of any virtual server among hypervisors (as described below) on the same or different physical servers or nodes, ensuring that the appropriate type of virtual function is correlated.

In view of the problems with respect to assigning virtual PCIe functions to virtual servers based on the virtual servers' virtual PCI function definitions, the management application 405 may focus on virtual functions (VFs) according to the PCIe SR-IOV standard and corresponding virtual function definitions (VF definitions)—however, this may also apply to non-virtualized adapters and devices, as well as to adapters and devices defined and implemented according to standards and architectures other than PCIe and SR-IOV. Therefore, the management application 405 defines a unique function identifier (UFID) for each virtual function definition that is part of a virtual server definition. The UFID may be unique per virtual server and have meaning for this particular virtual server only, or multiple virtual servers may use the same UFIDs. In particular, virtual servers created through cloning may all use the same set of UFIDs. When a virtual server is deployed on a physical server or node (and hypervisor), virtual functions (VFs) are allocated for that virtual server with the capabilities as required and specified by its virtual function definitions (VF definitions). To a VF that is allocated in correspondence to a VF definition, the UFID of that VF definition is assigned by the management application 405. This assignment is made in a configuration managed by the management application 405 (e.g., on IBM zEnterprise systems, this is done in a system-wide I/O configuration dataset). The management application 405 in turn allows a deployed and activated virtual server to query the functions that have been assigned to it, which returns the UFID assigned to each function. When the virtual server is moved to another physical server or node, again VFs are allocated with equivalent capabilities as available on the original physical server. The identical UFID as specified in the corresponding VF definition (as indicated by the configuration) is assigned to each of these VFs. Therefore, the virtual server is again able to identify these VFs, based on the UFIDs as specified in its VF definitions.

While a single item is illustrated for the management application 405 (and other items) by FIG. 4A, these representations are not intended to be limiting, and thus the management application 405 may represent a plurality of applications. For example, multiple applications 405 in different locations may be utilized to assign UFIDs in support of server virtualization. In addition, although one modular breakdown of the management application 405 is offered, it should be understood that the same operability may be provided using fewer, greater, or differently named modules. Although it is not specifically illustrated in the figures, the management application 405 may further include a user interface module, an application programmable interface module, and a notification module; 44. Examples of notifications may include, but are not limited to, text messaging (e.g., SMS), audio alerts (e.g., telephone calls, cellphone calls, VoIP calls, voicemails, loudspeaker announcements, etc.), electronic mail (e.g., POP, IMAP, SMTP), desktop alerts (e.g., dialog, balloon, modal window, toast, etc.), pager (e.g., SNPP), instant messaging (e.g., IRC, ICQ, AIM, Yahoo! Messenger, MSN, XMPP, iMessage), and the like.

The storage database 409 may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage database 409 may include a database, as described above, capable of maintaining cluster configuration data for the management application 405. The storage database 409 may generally be included within a computing device employing a computer operating system such as one of those mentioned above, and are accessed via a network in any one or more of a variety of manners. The storage database 409 may be a part of the management application 405, run independently within the same device or system as the management application 405 (as illustrated in FIG. 4A), or be external to and in communication with the management application 405. For example, the storage database 409 may be persistent storage (e.g., disk storage) internal to or attached to the cluster management sub-system 401 and/or may be connected to the nodes 410 of the cluster environment 400 through a cluster management network. For example, the management application 405 pushes configuration data down to the individual physical servers or nodes through the cluster management network, and retrieves physical configuration information as well as runtime information from the individual physical servers or nodes through the cluster management network. For high availability, both the cluster management sub-system 401 and the cluster management network are typically deployed in a fully redundant way, employing appropriate data mirroring and backup/restore concepts. The storage database 409 is in communication with the management application 405 of and/or applications external to the cluster management sub-system 401, such that the UFIDs, the configurations (430, 431), etc. may be archived in support of the processes described herein (e.g., assignment of UFIDs to virtual function definitions of virtual servers, allocation of virtual functions to the virtual function definitions of the virtual server, and assignment of the UFIDs to the allocated virtual functions).

The plurality of nodes 410.1-410.x are physical servers (e.g., computing devices as described above, such as cloud computing nodes 10) configured to deploy and migrate the virtual servers 420, 421 while those virtual servers 420, 421 retain the configurations 430, 431. Each node 410 may further include a plurality of hypervisors or virtual machine monitors. A hypervisor is a piece of computer software, firmware, and/or hardware that creates and/or manages virtual servers 420, 421. A node 410 on which a hypervisor is running one or more virtual machines is defined as a host machine and each virtual server 420, 421 is called a guest machine. The hypervisor presents the guest operating systems with a virtual operating platform and manages the execution of the guest operating systems so that multiple instances of a variety of operating systems may share the virtualized hardware resources (e.g., adapters 412.1 are shared among multiple virtual servers 420, 421 within that node 410.1). An adapter (e.g., 412.1-412.X') is a device that converts attributes of one device or system to those of another device or system. Utilizing the example above, each block 412 represents a plurality of PCI adapters that via PCIe and SR-IOV enable PF and VFs to be associated with the virtual servers 420, 421.

The virtual servers 420, 421 are software-based emulations of a computer that operate based on a computer architecture and operation of a real computer. The virtual servers 420, 421 may further include multiple operating system environments that co-exist, in strong isolation from each other and may provide application provisioning, maintenance, high availability and disaster recovery. The virtual servers 420, 421 utilize configurations 430, 431 to access and utilize the plurality of adapters 412 via their PF and VFs. The configurations 430, 431 are an arrangement of operational units that pertains to hardware, software, firmware, and documentation so that the virtual servers 420, 421 may access and utilize the plurality of adapters 412 via their PF and VFs. The configurations 430, 431 may also be referred to as definitions of the virtual servers 420, 421, especially with respect to configuring virtual function definitions that correspond to PCI functions.

Figure 5:
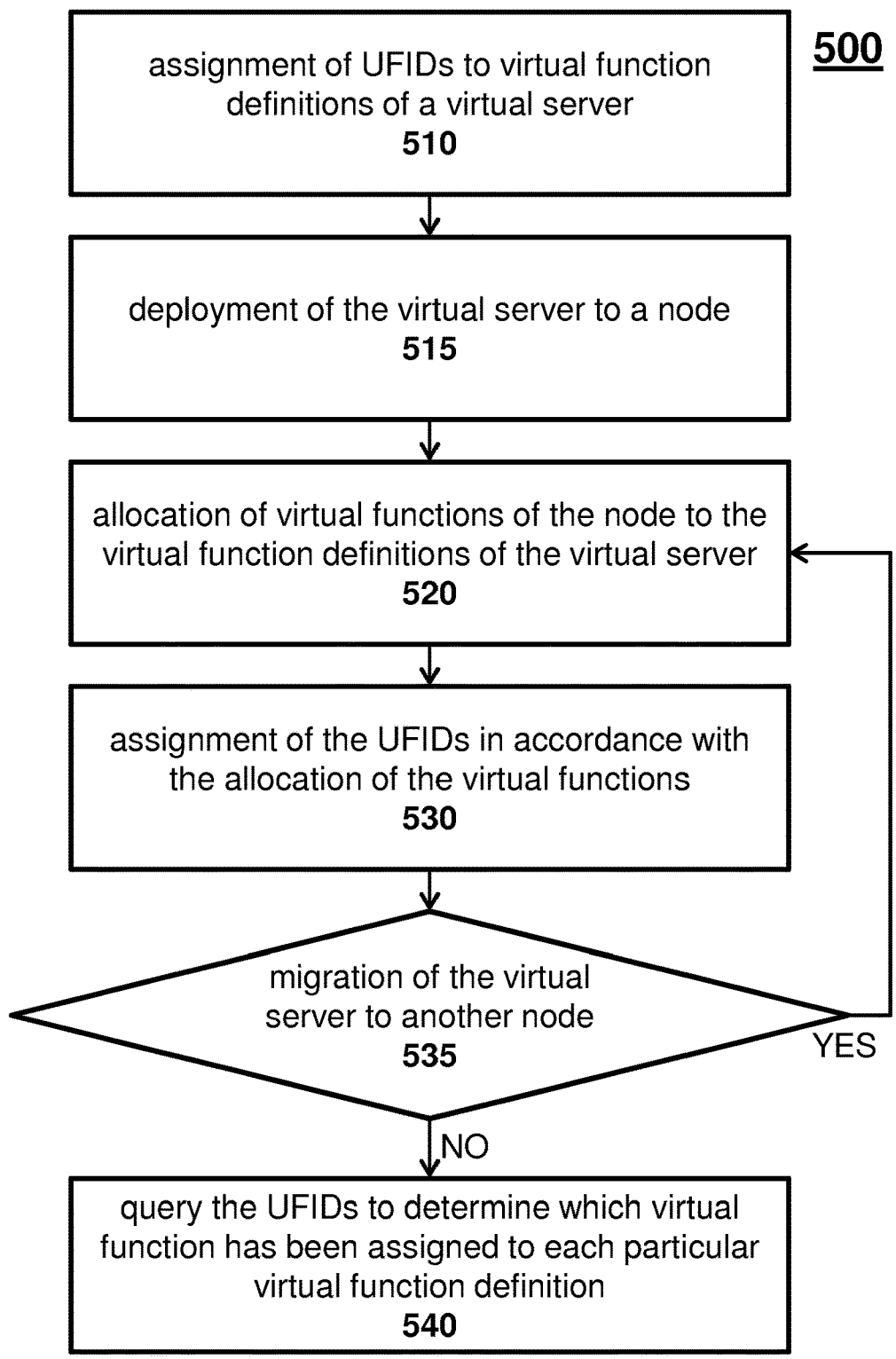
FIGS. 5-6 illustrate a process flow of a deployment and migration of virtual servers.
Figure 6:
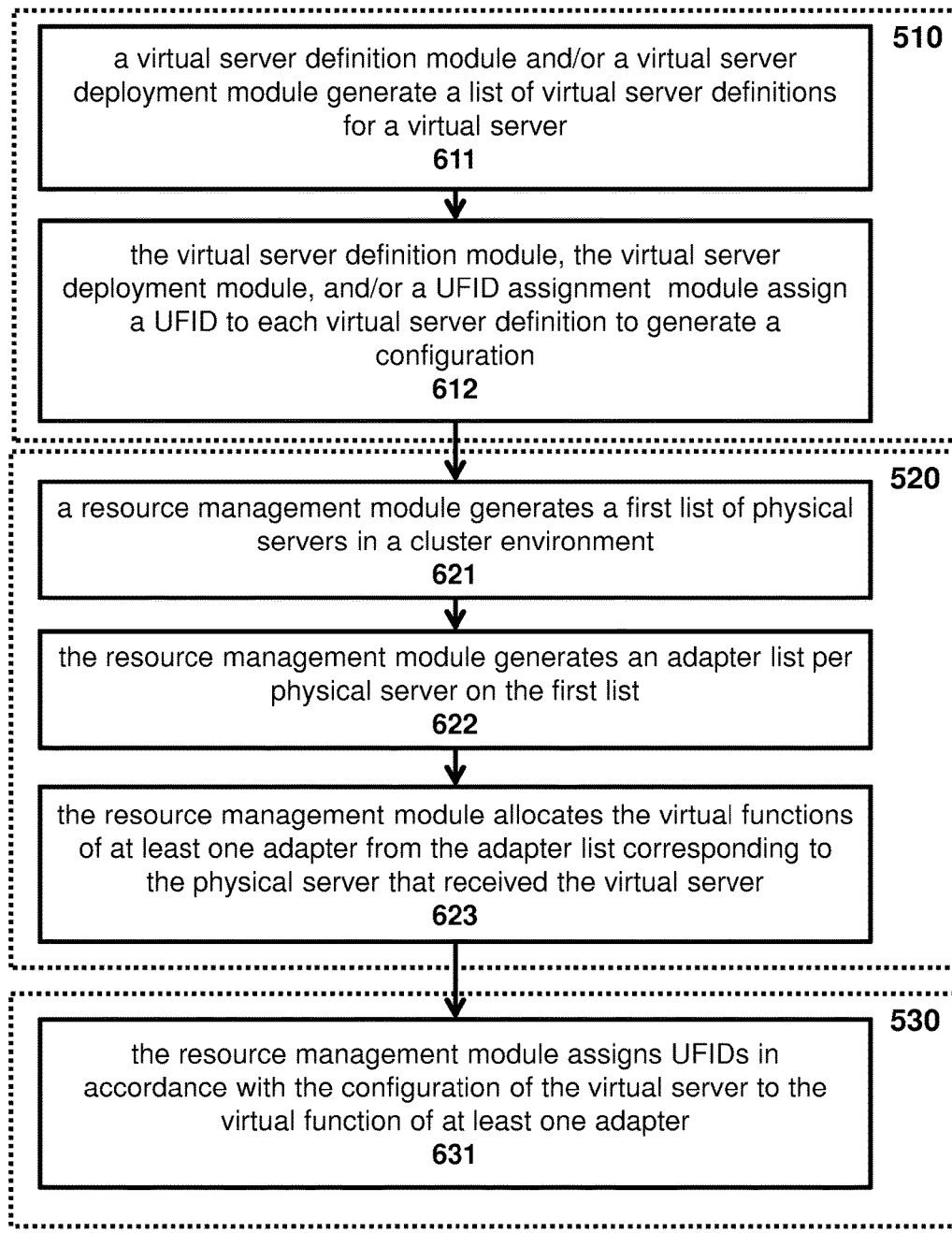

The operations by the system 44 will be described with reference to FIGS. 5-6. FIGS. 5-6 will also be described with reference to FIGS. 7-9, which illustrate virtual server schematics.

Figure 7:
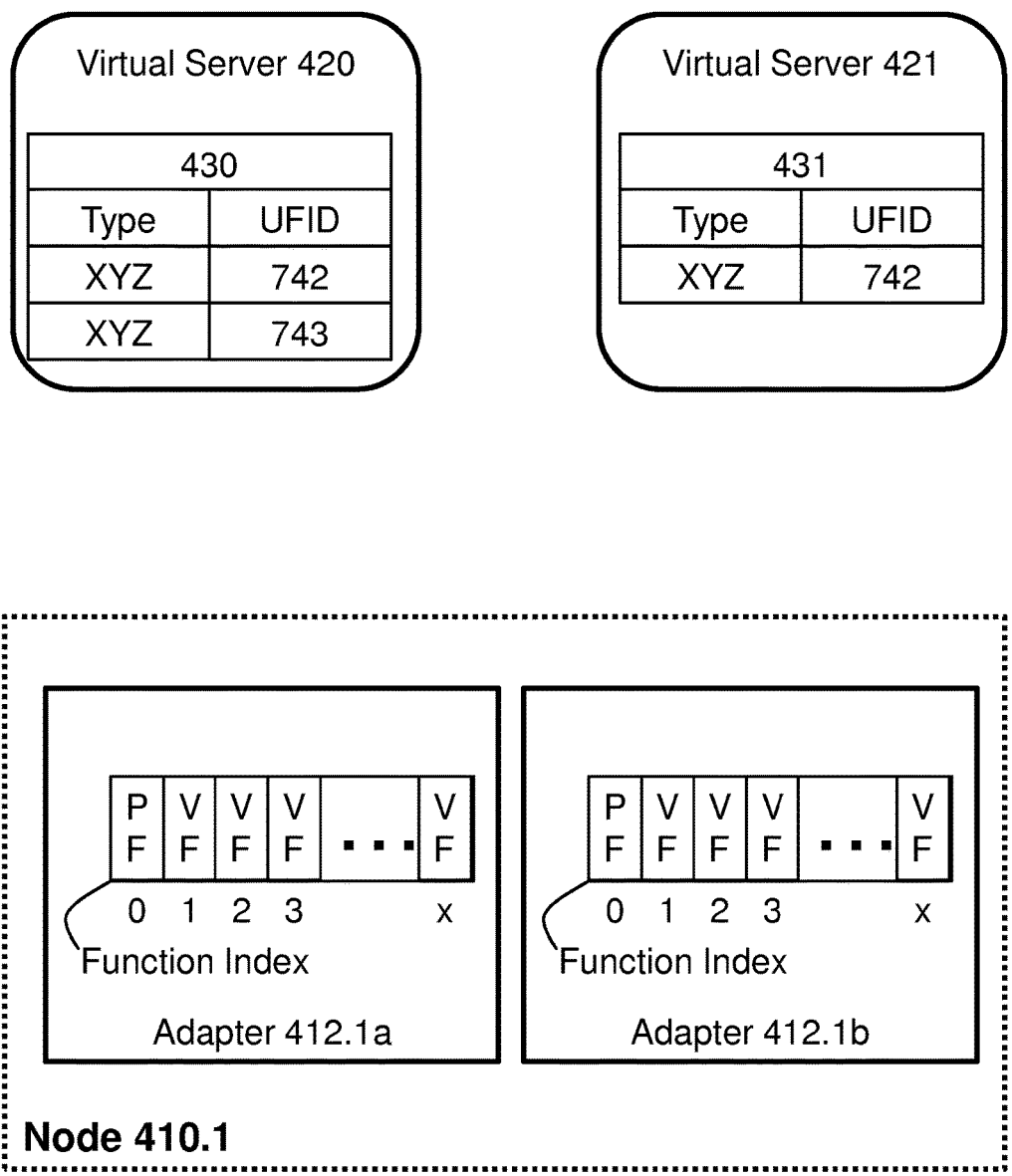
FIGS. 7-10B illustrate virtual server schematics.

FIG. 5 illustrates a process flow 500 of a deployment and migration of virtual servers 420, 421. The process flow 500 begins in block 510 with the assignment of UFIDs to virtual function definitions of each virtual server 420, 421. For example, FIG. 7 illustrates the virtual servers 420, 421 (VS 420 and VS 421, respectively) including configurations 430, 431 that show PCI UFIDs for virtual PCI functions as part of virtual server definitions and the node 410.1 with two physical PCI Adapters 412.1a, 412.1b installed thereon, each having one Physical Function (PF) and multiple Virtual Functions (VFs) of type XYZ. The virtual servers 420, 421 are defined to be executed on the node 410.1, such that the definition of VS 420 includes 2 VF definitions with UFIDs 742 and 743. The definition of VS 421 includes 1 VF definition with UFID 742. In this example, all VF definitions specify a requirement for VFs of type XYZ, and also that the VFs provided by the PCI Adapters 412.1a, 412.1b are all of that same type. At virtual server definition time, a virtual server may not be bound to a particular node of the cluster, nor are the VF definitions which are included in the virtual server definition tied to any VF of any particular physical PCI adapter on a cluster node.

Figure 8:
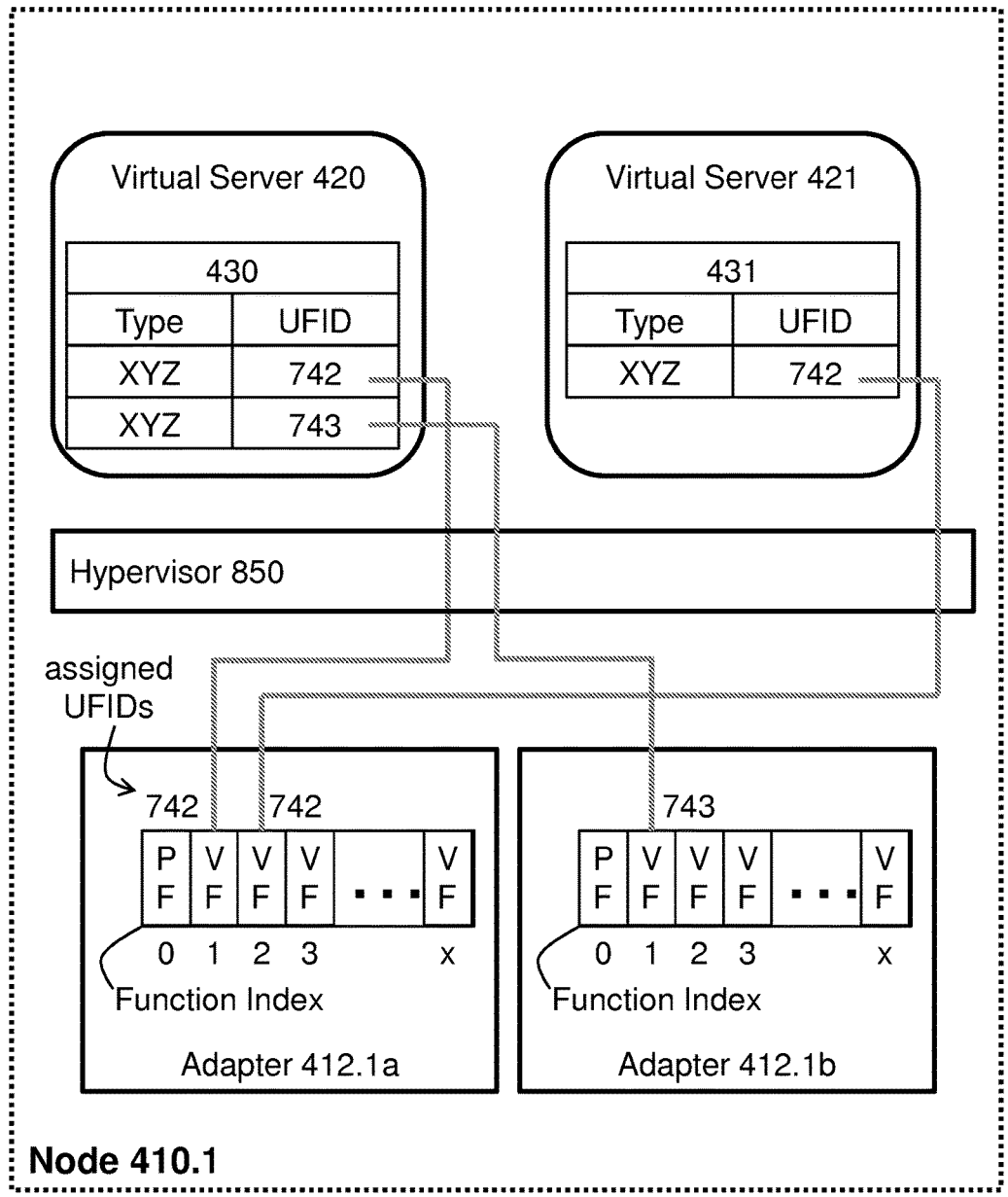

Next, in block 515, a deployment of the virtual servers 420, 421 from the cluster management sub-system 401 to a node 410.1 of the cluster environment 400 (see also 'DEPLOYMENT' of FIG. 4b) is performed by the system 44. The process flow 500 proceeds to block 520, where the system 44 executes an allocation of virtual functions of the node 410.1 (e.g., the virtual functions associated with the plurality of adapters 412.1) to the virtual function definitions of the virtual servers 420, 421. Then, in block 530, an assignment of the UFIDs in accordance with the allocation of the virtual functions is performed by the system 44. For example, FIG. 8 illustrates a deployment of virtual servers 420, 421 on the node 410.1, which is running a hypervisor 850. When VS 420 is deployed on the node 410.1, VF 1 on the PCI adapter 412.1a is allocated to the first virtual function definition of the configuration 430 and assigned UFID 742 of that configuration 430. Further, VF 1 on the PCI adapter 412.1b is allocated to the second virtual function definition of the configuration 430 and assigned UFID 743 of that configuration 430. When VS 421 is deployed on the node 410.1, VF 2 on the PCI adapter 412.1a is allocated to the first virtual function definition of the configuration 431 and assigned UFID 742 of that configuration 431. When VS 420 starts executing, it queries the configuration 430 to which it has access, and finds two VFs with associated UFIDs 742 and 743, corresponding to its VF definitions. When VS 421 starts executing, it queries the configuration 431 to which it has access, and finds one VF with associated UFID 742, corresponding to its VF definitions.

Figure 9:
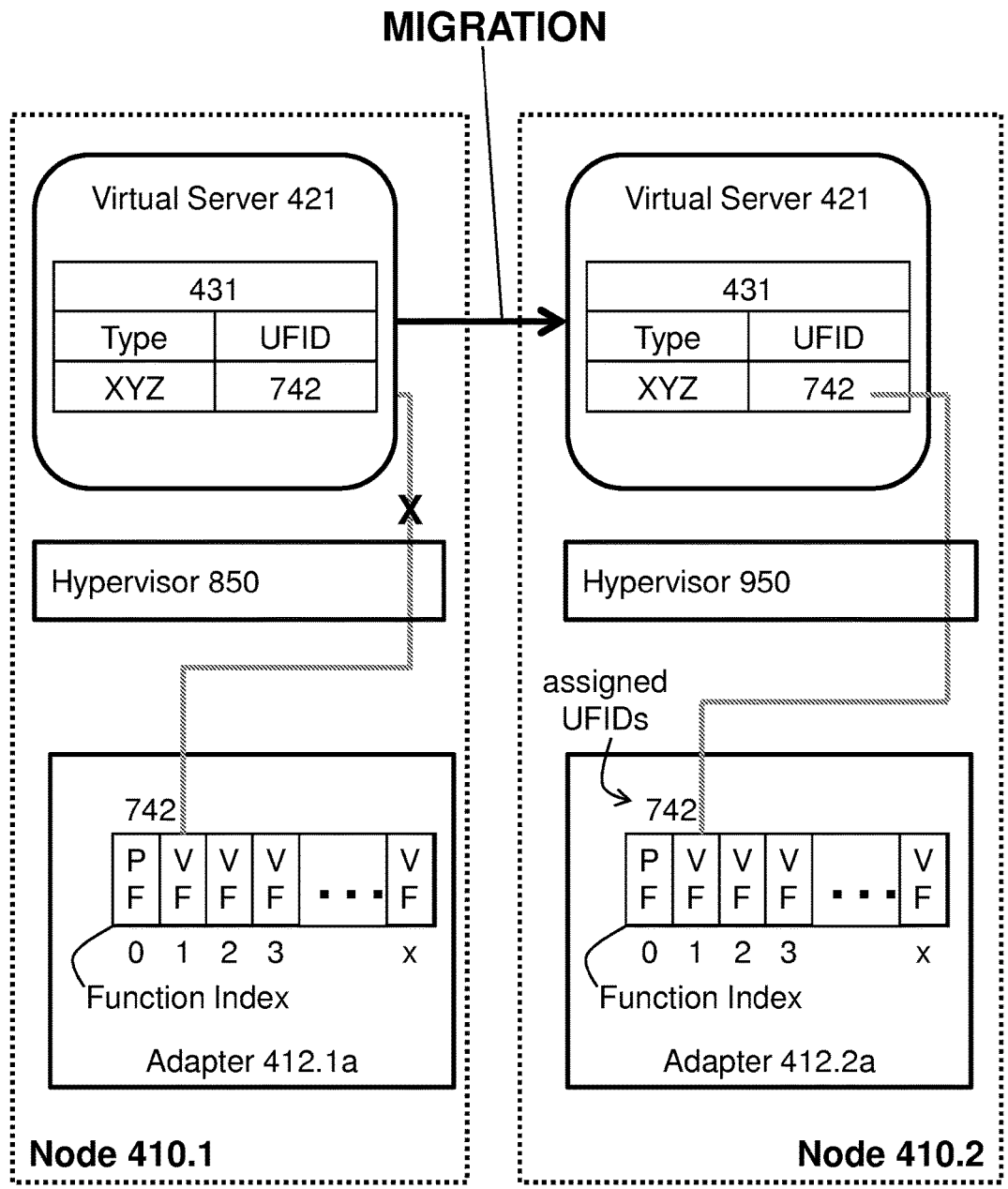

The process flow 500 proceeds to decision block 535 where the system determines whether a migration of the virtual servers 420, 421 to another node 412.2 has been completed. If no migration has been completed (NO), the process flow 500 proceeds to block 540, where the system 44 queries the UFIDs to determine which virtual function has been assigned to each particular virtual function definition. If a migration has not been completed (YES), the process flow 500 returns to block 520, where the system 44 executes an allocation of virtual functions of the node 410.2 (see also 'MIGRATION' of FIG. 4B). For example, FIG. 9 illustrates a migration of VS 421 from the node 410.1, which is running the hypervisor 850, to the node 410.2, which is running a hypervisor 950. When VS 421 is migrated, a VF (e.g., VF 1) of the proper type XYZ is assigned to VS 421 on a PCI adapter 412.2*a* on the node 410.2. That is, the UFID 742 specified in the VF definition is assigned to that VF 1 of the PCI adapter 412.2*a* on the node 410.2. When VS 421 starts operating on the node 410.2 and queries the allocated configuration 431, it again finds a VF 1 with the expected UFID 742. This may be repeated by the system 44 for each deployment, cloning, migration, etc. of any of the virtual servers 420, 421.

FIG. 6 illustrates a process flow 600 that shows an interaction of the modules of the management application 405 to support the definition and deployment of virtual servers 420, 421, including the assignment (block 510) of UFIDs to virtual function definitions of each virtual server 420, 421, the allocation (block 520) of virtual functions to virtual function definitions of each virtual server 420, 421, and the assignment (also block 520) of UFIDs to these allocated virtual functions.

The process flow 600 begins, in block 611, where the virtual server definition module 406 and/or a virtual server deployment module 407 generate a list of virtual function definitions for each virtual server 420, 421. Next, in block 612, the virtual server definition module 406, the virtual server deployment module 407, and/or the UFID assignment module 408 assign a UFID to each virtual function definition to generate the configuration 430, 431.

The process flow 600 proceeds to block 621, where the resource management module 408 generates a first list of nodes 410 in a cluster environment 400. Next, in block 622, the resource management module 408 generates an adapter list per node 410 on the first list. Each adapter list itemizes the plurality of adapters 412 on a specific node 410. Then, in block 623, the resource management module 408 allocates the virtual functions of at least one adapter (e.g., 412.1) from the adapter list corresponding to the node (e.g., 410.1) that received the virtual servers 420, 421.

The process flow 600 proceeds to block 631, where the resource management module 408 assigns UFIDs in accordance with the configurations 430, 431 of the virtual servers 420, 421 to the virtual function of at least one adapter 412.1.

Figure 10A:
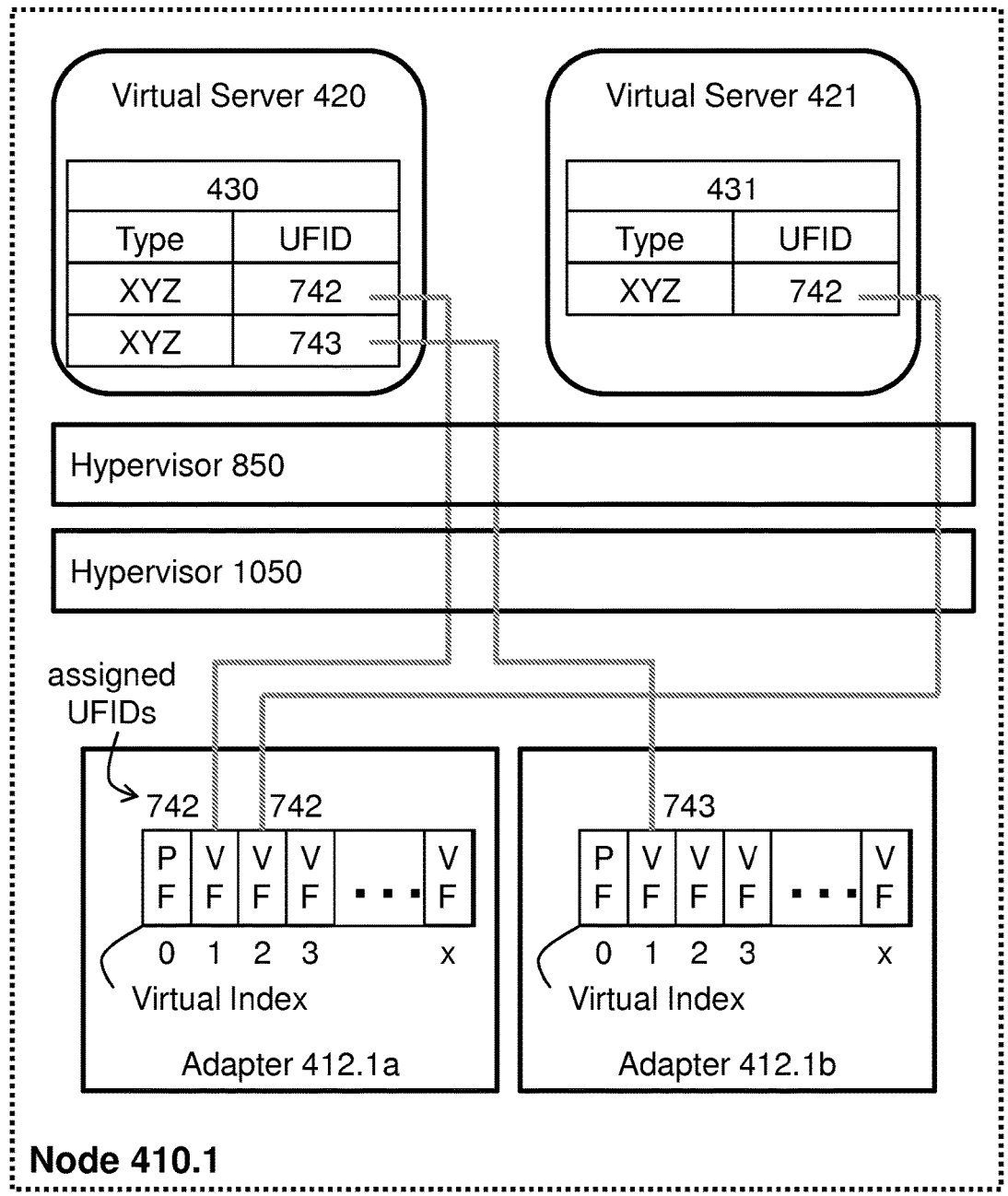
Figure 10B:
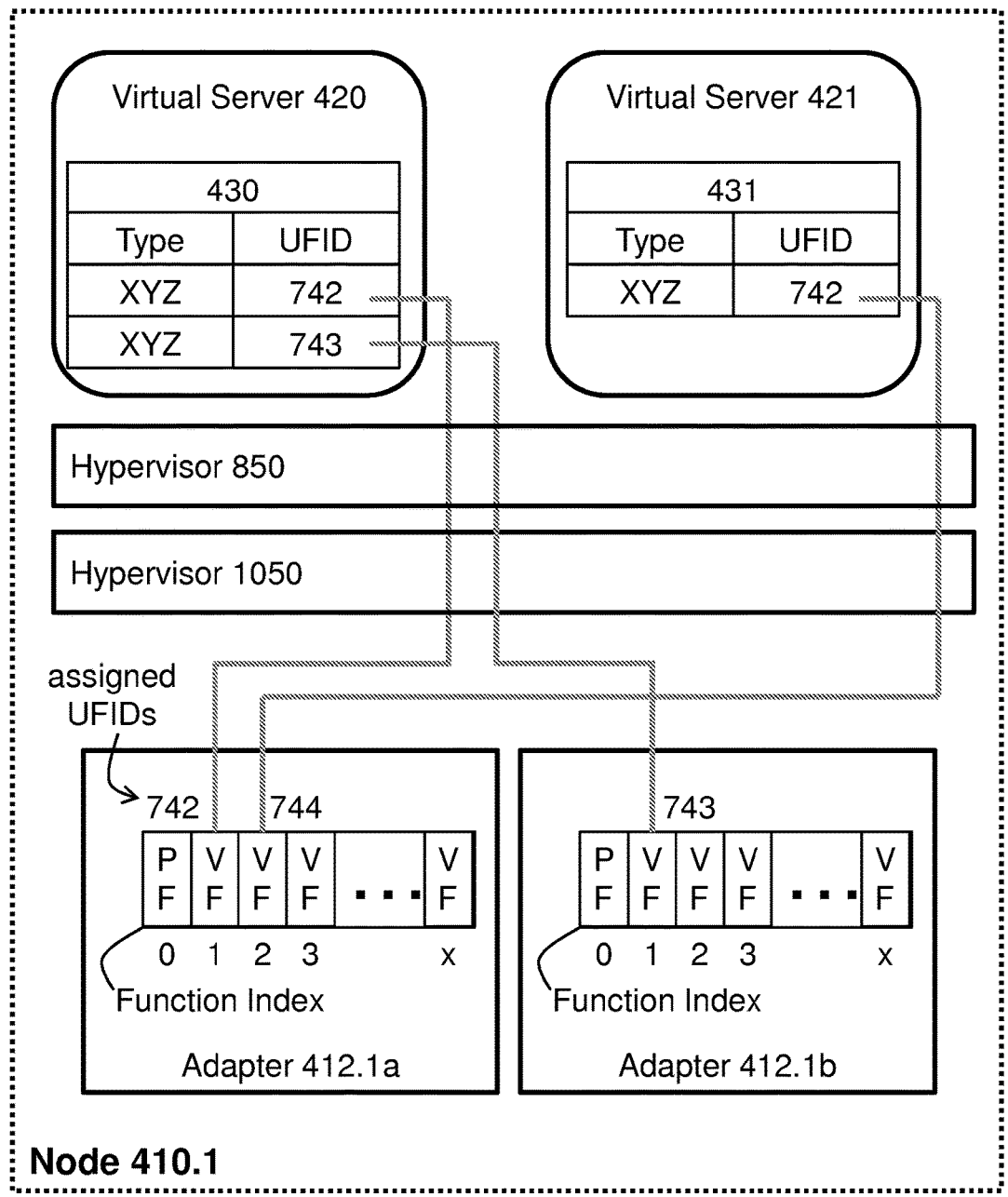

FIGS. 10A-10B illustrate a virtual server deployment with multi-level hypervisors. In the FIG. 10A example, one of the guests hosted by a first level hypervisor (HV 1050) is another hypervisor (HV 850). When VS 420 and VS 421 are deployed on HV 850, VFs of both PCI adapters 412.1*a*, 412.1*b* can be allocated to VS 420 and VS 421. After assigning each of these VFs, the proper UFID is mapped to these VFs according to their corresponding VF definitions. Both hypervisors enable pass-through of these VFs to the corresponding virtual servers (VS 420 and VS 421). In this case, the HV 1050 must allow its guests to use the same set of UFIDs.

In the FIG. 10B example, HV 1050 requires the set of UFIDs assigned to each of its guests to be unique, which assists in detecting guest misconfigurations. Further, the HV 850 must provide an appropriate UFID mapping for its guests. Each HV 850 guest still can use arbitrary UFID values, such as when HV 850 maps the arbitrary UFID values to a set of UFID values where each UFID is unique. Therefore, HV 850 may do a 1:1 mapping for the UFIDs of VS 420, but then has to map UFID 742 of VS 421 to a different value, e.g. 744. When VS 421 is started, it gets the VF with index 2 on the PCI adapter 412.1*a* assigned. The UFID of that VF has been defined to be 744, to ensure that the set of UFIDs assigned by HV 1050 to its guest HV 850 are unique. When VS 421 queries the UFID of this VF, HV 850 translates the response from 744 to 742.

Thus, migration across hypervisors by the system 44 as described above is a scheme that allows virtual servers to migrate from one hypervisor to another. These hypervisors may be hosted on the same or on different nodes of the cluster. Further, these hypervisors may be of the same or of different levels, i.e., they may have the same number of underlying hypervisors (0, 1, or even more). Migration from one hypervisor to another on the same node may be required in order upgrade a hypervisor. Migration from one hypervisor level to another may be required to exploit the capabilities of another hypervisor, such as getting better performance. When a virtual server is migrated to an upper-level hypervisor, that hypervisor may or may not need to map the UFID of a virtual server to the one assigned to the associated VF, depending on the system 44 implementation.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
defining, by the processor, a plurality of unique function identifiers for each virtual server definition that is part of a definition of a virtual server, the plurality of unique function identifiers including a unique function identifier;
allocating, by the processor, a virtual function to a virtual function definition of the virtual server, the virtual function definition of the virtual server being previously assigned the unique function identifier,
wherein the allocating of the virtual function to the virtual function definition of the virtual server comprises:
generating a first list of physical servers in a cluster environment;
generating an adapter list per physical server on the first list of physical servers; and
allocating a plurality of virtual functions of at least one adapter from the adapter list to each of a plurality of virtual function definitions of the virtual server, the at least one adapter corresponding to the physical server that received the virtual server, the plurality of virtual functions including the virtual function, the plurality of virtual function definitions including the virtual function definition,
wherein the allocating of the virtual function to the virtual function definition of the virtual server is in accordance with characteristics of the virtual function definition and is performed at a time of migration or deployment of the virtual server; and
assigning, by the processor, the unique function identifier to the virtual function in response to the allocating of the virtual function in accordance with a configuration of the virtual server to the virtual function of at least one adapter, the unique function identifier causing a discovery of the virtual function by the virtual server by:
generating a list of virtual function definitions of the virtual server, the list of virtual function definitions including the virtual function definition, and
assigning one of the plurality of unique function identifiers to each virtual function definition of the list of virtual function definitions, the plurality of unique function identifiers including the unique function identifier,
wherein the plurality of unique function identifiers defined to each virtual server definition supports a service for a corresponding virtual server to query the plurality of unique function identifiers to determine which virtual function on which physical adapter has been assigned to each particular virtual function definition,
wherein the plurality of unique function identifiers defined to each virtual server definition:
enable the corresponding virtual server to be moved to a subsequent physical server and
enable subsequent virtual functions of that subsequent physical server to be specified in a virtual definition of the corresponding virtual server and available in the subsequent physical server,
wherein assigning the unique function identifier to the virtual function definition of the virtual server comprises storing the assigning of the one of the plurality of unique function identifiers in a configuration of a virtual server,
wherein the unique function identifier causing the discovery of the virtual function by the virtual server when the virtual server queries the unique function identifier to determine which of a plurality of virtual functions has been allocated to the virtual function definition.

* * * * *